(12) United States Patent
Unger et al.

(10) Patent No.: US 12,130,058 B2
(45) Date of Patent: Oct. 29, 2024

(54) CLOSURE PLUG FOR A COLLECTOR OF A REFRIGERANT CIRCUIT

(71) Applicant: MAHLE International GmbH, Stuttgart (DE)

(72) Inventors: Sascha Unger, Ludwigsburg (DE); Adrian Iosub, Sindelfingen (DE)

(73) Assignee: Mahle International GmbH, Stuttgart (DE)

( * ) Notice: Subject to any disclaimer, the term of this patent is extended or adjusted under 35 U.S.C. 154(b) by 45 days.

(21) Appl. No.: 17/541,335

(22) Filed: Dec. 3, 2021

(65) Prior Publication Data

US 2022/0178485 A1 Jun. 9, 2022

(30) Foreign Application Priority Data

Dec. 4, 2020 (DE) ...................... 10 2020 215 372.8

(51) Int. Cl.
*F25B 39/04* (2006.01)
*F16L 55/11* (2006.01)
(Continued)

(52) U.S. Cl.
CPC .............. *F25B 39/04* (2013.01); *F16L 55/11* (2013.01); *B29C 2045/14459* (2013.01); *F25B 41/40* (2021.01); *F25B 2339/044* (2013.01); *F25B 2339/0441* (2013.01); *F25B 2400/162* (2013.01); *F25B 2500/221* (2013.01)

(58) Field of Classification Search
CPC ........ B29C 2045/14459; F01P 11/0209; F01P 2011/0228; F01P 11/0276; F01P 2011/061; F16L 45/00; F16L 55/11; F16L 55/1108; F16L 55/1152; F16L 15/04; F28F 2220/00; F28F 9/10; B01D 46/0004; B01D 2201/304; B65D 39/08; F16B 33/004; F16J 13/12; F16J 15/002; F16J 15/004; F16J 15/006; F16J 15/008; F16J 15/065; F16N 2031/008; F25B 43/003; F25B 2400/162; F25B 2339/0441; F25B 2500/221
USPC ........ 220/304, 804, 288; D23/260; 215/356, 215/355, 364; 217/110; 277/352, 914, 277/921; 222/546, 552, 563
See application file for complete search history.

(56) References Cited

U.S. PATENT DOCUMENTS 2,366,975 A * 1/1945 Mcchesney ............. F16L 45/00
138/89
3,182,850 A * 5/1965 Bennett .................... F16J 13/12
220/304

(Continued)

FOREIGN PATENT DOCUMENTS

CN 202403462 U 8/2012
DE 19516096 C1 11/1996
(Continued)

*Primary Examiner* — Robert K Arundale
*Assistant Examiner* — Richard K. Durden
(74) *Attorney, Agent, or Firm* — Muncy, Geissler, Olds & Lowe, P.C.

(57) ABSTRACT

A closure plug for a collector of a refrigerant circuit with a substantially cylindrical base body with a circumferential wall, wherein a first circumferential groove, in which an O-ring is arranged, is provided in the circumferential wall, wherein an elastomer ring is injection molded onto the circumferential wall at an axial distance from the first circumferential groove.

10 Claims, 2 Drawing Sheets

(51) Int. Cl.
*B29C 45/14* (2006.01)
*F25B 41/40* (2021.01)

(56) References Cited

U.S. PATENT DOCUMENTS

| | | | | |
|---|---|---|---|---|
| 3,782,585 | A * | 1/1974 | Rosenwald | F16J 15/48 |
| | | | | 220/663 |
| 3,810,366 | A * | 5/1974 | Orth | F25B 43/003 |
| | | | | 62/474 |
| 4,580,816 | A * | 4/1986 | Campbell | F16L 37/025 |
| | | | | 285/321 |
| 5,370,150 | A * | 12/1994 | Nehm | F16L 29/02 |
| | | | | 137/454.2 |
| 5,752,726 | A | 5/1998 | Fixemer | |
| 6,223,556 | B1 * | 5/2001 | De Keuster | F25B 39/04 |
| | | | | 62/509 |
| 6,430,945 | B1 * | 8/2002 | Haussmann | B60H 1/3227 |
| | | | | 62/509 |
| 6,755,316 | B2 * | 6/2004 | Ono | B60K 15/0406 |
| | | | | 220/378 |
| 6,935,413 | B2 * | 8/2005 | Kamishima | F25B 43/003 |
| | | | | 165/110 |
| 7,334,607 | B2 | 2/2008 | Bellott et al. | |
| 7,595,278 | B2 * | 9/2009 | Powers | B01J 20/18 |
| | | | | 502/417 |
| 7,776,118 | B2 * | 8/2010 | Min | F25B 43/003 |
| | | | | 55/318 |
| 8,567,792 | B2 * | 10/2013 | Nomichi | F16K 1/04 |
| | | | | 277/609 |
| 9,822,897 | B2 * | 11/2017 | Gross | F16K 35/10 |
| 2001/0041286 | A1 * | 11/2001 | Cramer | H01M 50/655 |
| | | | | 429/89 |
| 2002/0074335 | A1 * | 6/2002 | Ono | B60K 15/0406 |
| | | | | 220/378 |
| 2005/0178147 | A1 | 8/2005 | Kaspar et al. | |
| 2006/0054402 | A1 * | 3/2006 | Dorian | B03C 1/286 |
| | | | | 184/1.5 |
| 2006/0123836 | A1 * | 6/2006 | Kaspar | F25B 43/006 |
| | | | | 62/509 |
| 2007/0022776 | A1 * | 2/2007 | Altendorfer | F25B 43/003 |
| | | | | 62/509 |
| 2007/0271955 | A1 | 11/2007 | Forster et al. | |
| 2009/0102184 | A1 | 4/2009 | Lechner et al. | |
| 2009/0108580 | A1 | 4/2009 | Hoffman | |
| 2013/0068778 | A1 * | 3/2013 | Griffiths | F01M 11/0408 |
| | | | | 220/601 |
| 2018/0164006 | A1 * | 6/2018 | Numasawa | F25B 39/04 |
| 2020/0009501 | A1 * | 1/2020 | Sussman | F25B 43/003 |
| 2022/0041033 | A1 * | 2/2022 | Gutierrez | F25B 39/04 |

FOREIGN PATENT DOCUMENTS

| | | | | |
|---|---|---|---|---|
| DE | 10213176 | A1 | 10/2003 | |
| DE | 10251777 | A1 | 5/2004 | |
| DE | 10066143 | B4 | 4/2005 | |
| DE | 202006006304 | U1 | 8/2007 | |
| DE | 202007004204 | U1 | 7/2008 | |
| DE | 202007012104 | U1 | 1/2009 | |
| DE | 102012201199 | A1 * | 8/2012 | F25B 39/04 |
| DE | 102014201887 | A1 * | 8/2015 | F01M 11/04 |
| DE | 102019208931 | A1 | 1/2020 | |
| EP | 806369 | A1 * | 11/1997 | B29C 45/1676 |
| EP | 1420219 | A1 | 5/2004 | |
| EP | 2108905 | A1 | 10/2009 | |
| FR | 2879169 | A1 | 6/2006 | |
| FR | 2887860 | A1 | 1/2007 | |
| JP | 2001033121 | A * | 2/2001 | |
| JP | 2004301173 | A * | 10/2004 | |
| JP | 2005201356 | A * | 7/2005 | |
| JP | 2005226471 | A * | 8/2005 | |
| KR | 20160123117 | A * | 4/2015 | |
| KR | 20200075367 | A * | 6/2020 | F25B 43/003 |
| RU | 76891 | U1 | 10/2008 | |
| WO | WO0064774 | A1 | 11/2000 | |
| WO | WO2004061376 | A1 | 7/2004 | |
| WO | WO2005050119 | A2 | 6/2005 | |

* cited by examiner

CLOSURE PLUG FOR A COLLECTOR OF A REFRIGERANT CIRCUIT

This nonprovisional application claims priority under 35 U.S.C. § 119(a) to German Patent Application No. 10 2020 215 372.8, which was filed in Germany on Dec. 4, 2020, and which is herein incorporated by reference.

BACKGROUND OF THE INVENTION

Field of the Invention

The present invention relates to a closure plug for a collector of a refrigerant circuit, in particular a collector of a condenser of a refrigerant circuit.

Description of the Background Art

Cooling circuits in which a collector is provided which temporarily stores refrigerants are known for motor vehicles. Collectors of this kind that are integrated in a condenser are also known, wherein the refrigerant typically flows between the desuperheating region and condensation region of the condenser and the subcooling region of the condenser into the collector interposed there fluidically in order to also undergo a liquid-gas separation in addition to the intermediate storage of refrigerants. In this case, essentially only liquid refrigerant flows downstream of the collector into the subcooling region of the condenser; this promotes the effectiveness of the subcooling of the refrigerant because no amount of gas or only a small amount of gas flows into the subcooling region.

In this regard, a dryer insert and/or filter insert, which filters and/or dries the refrigerant, are optionally also used in the collector. In the case of such collectors, provision is generally made for the collector to be accessible after the refrigerant circuit has been filled, for example, to replace the insert, because otherwise the entire collector or the entire condenser would have to be replaced. Such collectors accordingly have a closable opening. A closure plug, which is intended to securely close the opening, is inserted into this opening.

A collector for a condenser of a refrigerant circuit is known from FR 2 879 169 A1, which has an opening into which a closure plug can be inserted to close the opening. The closure plug in this case has an approximately cylindrical base body which defines a circumferential wall. To seal the opening by means of the closure plug, the closure plug on its circumferential wall has a groove into which an O-ring is inserted. The O-ring serves to seal the refrigerant-filled interior of the collector with respect to the closure plug, so that the refrigerant or the refrigerant-oil mixture cannot escape from the collector due to the addition of oil from the compressor. The closure plug has the disadvantage that although the O-ring seals the interior of the collector, the O-ring, sealing the interior, and parts of the closure plug are nevertheless exposed from the outside to media that can cause or promote contamination and/or corrosion of the O-ring, the closure plug, and/or the wall of the collector, such as, for example, dirt, salt, and/or water, etc. This proves to be disadvantageous, especially since if the O-ring is heavily soiled, its sealing capabilities can also be impaired.

A collector of a condenser of a refrigerant circuit is known from DE 102 13 176 A1, which corresponds to US 2005/0178147, which is incorporated herein by reference and which has an opening into which a closure plug can be inserted to close the opening. The closure plug in this case has an approximately cylindrical base body which defines a circumferential wall. To seal the opening by means of the closure plug, the closure plug on its circumferential wall has two grooves into which an O-ring is inserted. The two grooves and thus also the two O-rings, a first O-ring and a second O-ring, are arranged offset in the axial direction of the cylindrical base body. In this case, one O-ring seals the collector towards the inside so that the refrigerant cannot escape. The other O-ring seals the collector towards the outside so that the O-ring, which seals towards the inside, is not contaminated by media from the outside. However, this has the disadvantage that two O-rings are required, which increases the costs, and that these two O-rings must be installed individually and correctly placed, which increases the installation effort and thus also the installation costs and increases the risk of incorrect installation, which could negatively affect functionality.

SUMMARY OF THE INVENTION

It is therefore an object of the present invention to provide a closure plug for a collector, which is improved over the prior art and is simplified with respect to production and assembly.

An exemplary embodiment of the invention relates to a closure plug for a collector of a refrigerant circuit, with a substantially cylindrical base body with a circumferential wall, wherein a first circumferential groove, in which an O-ring is arranged, is provided in the circumferential wall, wherein an elastomer ring is injection molded onto the circumferential wall at an axial distance from the first circumferential groove. This prevents a reliable seal against the penetration of media from the outside, and yet the time-consuming assembly of two expensive O-rings can be avoided. Nevertheless, protection of the O-ring can be achieved by means of the cost-effective solution of the molding-on of an elastomer ring. In this way, the tightness of the closure plug inserted in the collector can be achieved in the long term.

The circumferential wall can have a second circumferential groove, wherein the molded-on elastomer ring also engages in or is injection molded into the second circumferential groove. It is achieved in this way that the molded-on elastomer ring encounters an enlarged contact surface in the circumferential groove, which promotes its stability and attachment.

The elastomer ring can fill the second circumferential groove and protrude from the second circumferential groove in the radial direction. A secure arrangement and attachment with good sealing are thus achieved.

The elastomer ring can have a substantially angular, rectangular, round, or oval cross section in section. It is achieved thereby that the sealing can occur in a suitable manner on a wall of a collector.

The circumferential wall can form a shoulder, wherein the shoulder is arranged adjacent to the second circumferential groove. It is achieved thereby that the elastomer ring can also be clamped between a wall or surface of the collector and the shoulder, which further improves the sealing effect.

A third circumferential groove can be arranged axially between the first circumferential groove and the molded-on elastomer ring or between the first circumferential groove and the second circumferential groove. Said third circumferential groove can effect a mechanical decoupling of the two axial end regions of the closure plug with a simultaneous saving of materials. This can also be accompanied by a change in diameter.

The closure plug can have a first axial end face and a second axial end face, wherein the closure plug has at least one recess on the first axial end face and/or on the second axial end face. As a result, for example, due to compressive forces, an improved contact of the O-ring on the corresponding wall of the collector can be achieved. Points of application for tools for attaching the sealing plug can also be provided.

The first axial end face can have a first recess, in particular a substantially dome-shaped recess. As a result, a compressive force due to the pressure in the collector can act radially outwards on the dome and act on the O-ring, placed there, against the corresponding wall of the collector, which increases the tightness.

Furthermore, the second axial end face can have a tool receptacle, in particular a hexagon socket or an Allen socket. In this way, the closure plug can be fixedly placed and secured using a tool.

The second axial end face can also have further second recesses, which are arranged in particular around the tool receptacle. These further second recesses can also serve to reduce the weight and/or to receive tools.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
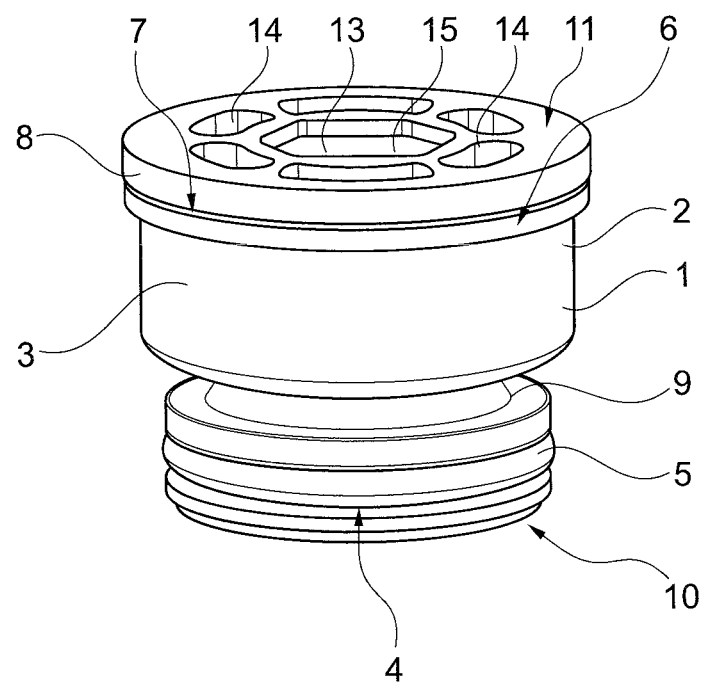
FIG. 1 shows a schematic, perspective view of an exemplary embodiment of a closure plug of the invention for a collector of a refrigerant circuit.
Figure 2:
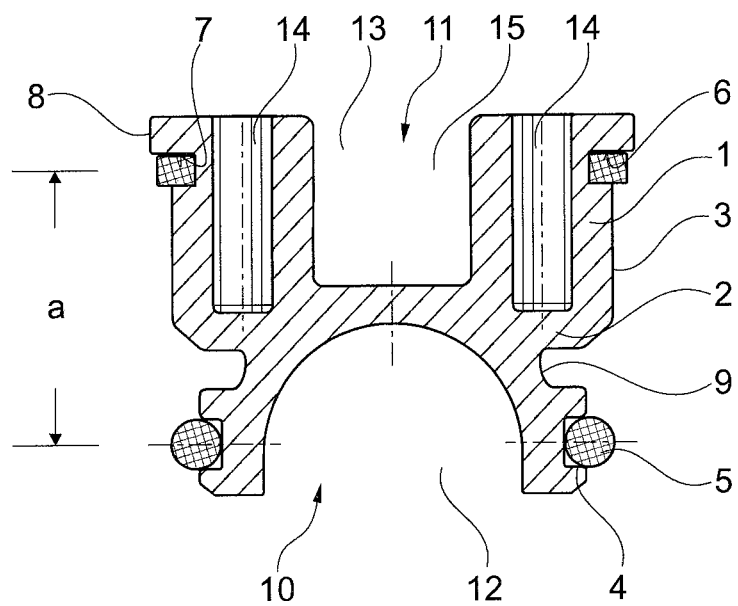
FIG. 2 shows a schematic sectional view of the exemplary embodiment of a closure plug according to the invention.
Figure 3:
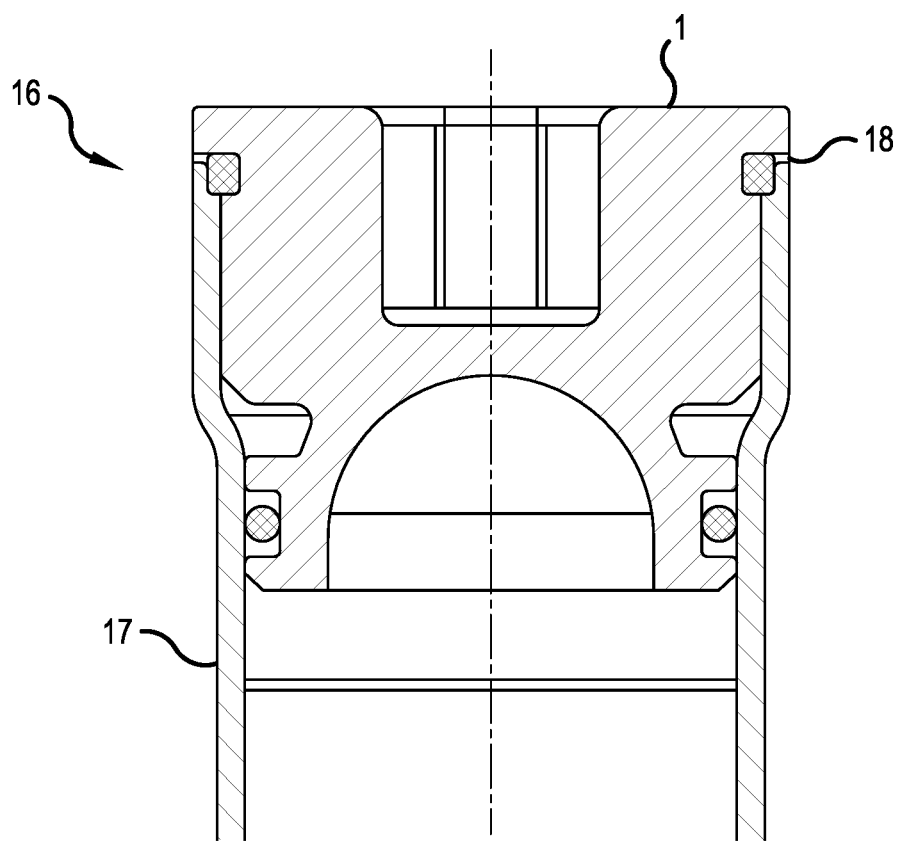
FIG. 3 shows a schematic sectional view of the exemplary embodiment of the closure plug in an opening of a housing component of a collector of a refrigerant circuit.

FIGS. 1-3 show, in various views, an exemplary embodiment of a closure plug 1 of the invention for a collector 16 of a refrigerant circuit. The collector 16 can be formed as a cylindrical component 17 with a circumferential wall and with a round opening 18 into which closure plug 1 can be inserted. In this regard, the collector 16 can, for example, be connected to or integrated into a condenser of the refrigerant circuit. The refrigerant circuit is part of a motor vehicle, for example.

Closure plug 1 for a collector of a refrigerant circuit has a substantially cylindrical base body 2 with a circumferential wall 3. Base body 2 is preferably made of plastic or metal, therefore, for example, of a polymer or a metal alloy, such as polyamide or an aluminum alloy.

A first circumferential groove 4, in which an O-ring 5 is arranged, is provided in circumferential wall 3. O-ring 5 preferably has a round cross section and is made of rubber or of an elastomeric material. O-ring 5 protrudes radially beyond and out of first circumferential groove 4.

Furthermore, an elastomer ring 6 is injection molded onto circumferential wall 3 at an axial distance 'a' from circumferential groove 4. This elastomer ring 6 is thus injection molded onto circumferential wall 3 during the manufacturing process and is thus attached to it.

For this purpose, circumferential wall 3 can optionally have a second circumferential groove 7. The molded-on elastomer ring 6, placed in this way, can also engage in second circumferential groove 7 or be injection molded into it. As can be seen from FIG. 2, elastomer ring 6 can fill second circumferential groove 7 and protrude from second circumferential groove 7 in the radial direction.

It can also be seen from FIG. 2 that elastomer ring 6 has a substantially angular or rectangular cross section in section. Alternatively, elastomer ring 6 can also have a different cross section in section, for example, partially angular and partially round or oval. The elastomer ring 6 ideally assumes the shape of circumferential groove 7.

In the exemplary embodiment shown, circumferential wall 3 has a shoulder 8 which protrudes radially. Shoulder 8 is situated adjacent to second circumferential groove 7.

In an advantageous exemplary embodiment, a third circumferential groove 9 is arranged axially between first circumferential groove 4 and the molded-on elastomer ring 6 or between first circumferential groove 4 and second circumferential groove 7. This circumferential groove 9 can promote the elasticity of the closure plug.

According to the exemplary embodiment, closure plug 1 has a first axial end face 10 and a second axial end face 11. First axial end face 10 is advantageously end face 10 which faces inwardly in the collector and second end face 11 thereby faces out of the collector when closure plug 1 is placed in the collector.

Closure plug 1 preferably has at least one recess 12, 13, 14 on first axial end face 10 and/or on second axial end face 11.

FIG. 2 shows that first axial end face 10 has a first recess 12, in particular a substantially dome-shaped recess 12. Said recess 12 serves to improve the seal by means of O-ring 5, because the end region of closure plug 1 with recess 12 expands under internal pressure in the collector and holds O-ring 5 better on the collector.

Second axial end face 11 has an optional tool receptacle 15 as a recess 13, in particular a hexagon socket or an Allen socket.

Optionally, it can also be provided that second axial end face 11 has further second recesses 14, which are arranged in particular around tool receptacle 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A collector of a refrigerant circuit, the collector comprising:
   a housing component with an opening; and
   a closure plug that seals the opening, the closure plug comprising:
      a substantially cylindrical base body with a circumferential wall having a first circumferential groove, a second circumferential groove axially spaced from the first circumferential groove, and a third circumferential groove arranged axially between the first circumferential groove and the second circumferential groove;

an O-ring arranged in the first circumferential groove; and an elastomer ring that is injection molded into the second circumferential groove;

wherein an outer diameter of the closure plug is smaller in the third circumferential groove than at all remaining portions of the closure plug.

2. The collector according to claim 1, wherein the elastomer ring fills the second circumferential groove and protrudes from the second circumferential groove in a radial direction.

3. The collector according to claim 1, wherein the elastomer ring has a substantially angular, rectangular, round, or oval cross section.

4. The collector according to claim 1, wherein the circumferential wall has a shoulder, and wherein the shoulder is situated adjacent to the second circumferential groove.

5. The collector according to claim 1, wherein the closure plug has a first axial end face and a second axial end face, and wherein the closure plug has at least one recess on the first axial end face and/or on the second axial end face.

6. The collector according to claim 5, wherein the at least one recess includes a first recess provided in the first axial end face.

7. The collector according to claim 6, wherein the at least one recess includes a second recess provided in the second axial end face, the second recess being a tool receptacle.

8. The collector according to claim 7, wherein the second axial end face has further recesses, which are arranged around the tool receptacle.

9. The collector according to claim 7, wherein the tool receptacle is a hexagon socket or an Allen socket.

10. The collector according to claim 6, wherein the first recess is a dome-shaped recess.

* * * * *